US007767290B2

(12) United States Patent
Kim et al.

(10) Patent No.: US 7,767,290 B2
(45) **Date of Patent: *Aug. 3, 2010**

(54) SLURRY COMPOSITION, GREEN SHEET, AND METHOD FOR MANUFACTURING BARRIER RIBS OF PLASMA DISPLAY PANEL

(75) Inventors: Yong Ho Kim, Chungcheongbuk-do (KR); Eun Tae Lee, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 628 days.

This patent is subject to a terminal disclaimer.

(21) Appl. No.: 11/506,928

(22) Filed: Aug. 21, 2006

(65) Prior Publication Data

US 2007/0126331 A1 Jun. 7, 2007

(30) Foreign Application Priority Data

Dec. 6, 2005 (KR) ...................... 10-2005-0118167

(51) Int. Cl.
*B32B 7/02* (2006.01)
*C03C 1/00* (2006.01)

(52) U.S. Cl. ........................ 428/212; 428/218; 428/432; 428/699; 428/701; 428/702; 501/32; 313/292

(58) Field of Classification Search ........................ None
See application file for complete search history.

(56) References Cited

U.S. PATENT DOCUMENTS 5,909,083 A 6/1999 Asano et al.
6,039,622 A 3/2000 Kosaka et al.
6,194,333 B1 * 2/2001 Ryu ............................ 501/32
6,297,310 B1 10/2001 Jang et al.
6,659,828 B1 12/2003 Seibold et al.
2003/0073564 A1 4/2003 Okunaga et al.
2004/0246204 A1 12/2004 Aoki et al.
2004/0248048 A1 12/2004 Lee
2005/0236962 A1 * 10/2005 Lee ............................ 313/495

(Continued)

FOREIGN PATENT DOCUMENTS

CN 1701410 A 11/2005

(Continued)

OTHER PUBLICATIONS

Korean Office Action (Notice of Decision to Grant a Patent) issued on May 31, 2007 for Korean Patent Application No. 10-2005-0118167, pp. 1-2.

*Primary Examiner*—Ling Xu
(74) *Attorney, Agent, or Firm*—Birch, Stewart, Kolasch & Birch, LLP

(57) ABSTRACT

A slurry composition for forming a double-layered barrier rib of a plasma display panel is provided. The slurry composition for barrier ribs comprises about 100 parts by weight of a mixture comprising a glass powder and a filler; about 20 to 50 parts by weight of a solvent; about 0.01 to 2 parts by weight of a dispersing agent; about 1 to 10 parts by weight of a plasticizer; and about 10 to 20 parts by weight of a binder. A green sheet employing such a slurry compositions is disclosed as is methods of manufacturing a double layered barrier rib using such slurry compositions to form a green sheet.

7 Claims, 7 Drawing Sheets

U.S. PATENT DOCUMENTS

| | | | | |
|---|---|---|---|---|
| 2005/0271982 | A1* | 12/2005 | Setsuda et al. | 430/321 |
| 2006/0076653 | A1* | 4/2006 | Song et al. | 257/629 |
| 2007/0155609 | A1* | 7/2007 | Choi | 501/32 |

FOREIGN PATENT DOCUMENTS

| | | | |
|---|---|---|---|
| DE | 19817478 | A | 11/1999 |
| KR | 2000-0014545 | A | 3/2000 |
| KR | 2001-0056986 | A | 7/2001 |
| WO | WO-2004/012854 | A | 2/2004 |
| WO | WO-2004/053915 | A | 6/2004 |

* cited by examiner

SLURRY COMPOSITION, GREEN SHEET, AND METHOD FOR MANUFACTURING BARRIER RIBS OF PLASMA DISPLAY PANEL

This application claims priority to Korean patent application 10-2005-0118167 filed on Dec. 6, 2005, under 35 U.S.C. §119, the entire contents of which are herein incorporated by reference.

BACKGROUND OF THE INVENTION

1. Field of the Invention

The present invention relates to a slurry composition, and a green sheet, for barrier ribs of plasma display panel, particularly to a slurry composition, and a green sheet, for double-layered barrier ribs. The present invention also relates to a method for manufacturing a double-layered barrier rib.

2. Description of the Related Art

A plasma display panel (PDP) is a flat panel display device that can display images or information by using the light-emitting phenomenon of plasma discharge. Generally, PDPs are divided into DC-types and AC-types according to panel structure and driving method.

PDPs are display devices using the light-emitting phenomenon of visible photons generated from the energy difference occurring when ultraviolet radiation excites a phosphor lining in a cell and then returns to the ground state, wherein the ultraviolet radiation is generated by discharge of a gas (such as He, Xe, etc.) provided in each cell when generating plasma discharge in a discharge cell divided by ribs.

PDPs have such advantages as easiness in manufacturing by simple structure, high brightness, high luminous efficacy, memory capacity, and wide viewing angle over 160°. PDPs can also be advantageously used for wide screens of 40 inches or more.

Hereinafter, the basic structure of a PDP will be described.

The structure of a PDP generally includes an upper substrate and a lower substrate oppositely disposed thereto, barrier ribs, and cells defined by the two substrates and barrier ribs. Transparent electrodes are disposed on the upper substrate, and bus electrodes are disposed on the transparent electrodes in order to reduce resistance of the transparent electrodes. Address electrodes, also called data electrodes, are formed on the lower substrate.

The cells divided by the barrier ribs are lined with phosphors. Further, an upper dielectric layer is disposed on the upper substrate to cover the transparent electrodes and the bus electrodes. Also, a lower dielectric layer is disposed on the lower substrate to cover the address electrodes. A protection layer, generally consisting of magnesium oxide, is disposed on the upper dielectric layer.

The barrier ribs are present to maintain a discharge distance between the upper substrate and the lower substrate, as well as to prevent electrical, optical cross-talk between adjacent cells. Formation of the barrier ribs is one of the most important steps in the manufacturing process of PDPs in order to achieve good display quality and efficiency. Therefore, there has been much research on the formation of barrier ribs, as the size of panels increase.

In general, the barrier ribs are formed by the Sand Blasting method, the Screen Printing method, or the Photo Etching method.

In the Sand Blasting method, the address electrodes and the dielectric layer are first formed on the lower substrate, and then a glass paste, used as the material for the barrier ribs, is applied thereto, followed by a sintering step. Next, a stripe type of mask pattern is disposed thereon, and fine sand particles are sprayed thereon at high speed through the mask pattern, thereby forming the barrier ribs.

In the Sand Blasting method, the cost of equipment is high, and the process is also complex. Moreover, a considerably high physical impact is applied to the lower substrate, and thus, cracks may be caused during the sintering step.

In the Screen Printing method, the address electrodes and the dielectric layer are formed on the lower substrate, followed by disposing a stripe type of screen thereon. Subsequently, printing is performed repeatedly with a glass paste, used as the material for the barrier ribs, until a desired thickness of barrier ribs is obtained. Then, sintering is performed thereto.

In the Screen Printing method, the number of screen-printing steps is increased to obtain a desired thickness of barrier ribs due to limitations in the height of barrier rib which can be obtained by one screen-printing step. And, by repetition of the screen-printing step including aligning of the screen and the lower substrate, printing, and drying, the process becomes complex.

In the Photo-etching method, the address electrodes and the dielectric layer are first formed on the lower substrate, and then a paste, used as the material for the barrier ribs, is applied thereto. Then, a stripe type of mask pattern is positioned, and then the barrier ribs are shaped by etching the exposed portions through openings of the mask with an etching agent. This is then followed by sintering.

In the Photo-etching method, the process is delayed because the paste is applied several times to create the desired thickness of barrier ribs. Also, it is difficult to obtain barrier ribs that are shaped structurally and mechanically stable enough to retain the discharging space because the side portions are over-etched.

In short, conventional methods for forming the barrier ribs are complex as well as time-consuming, thus, the manufacturing costs are high. Further, it is difficult to form the barrier ribs to a desired shape with conventional methods.

For the foregoing reasons, there has been a need to develop an invention that can manufacture barrier ribs cheap, simply, and with a desired shape.

SUMMARY OF THE INVENTION

An object of the present invention is to provide a slurry composition, a green sheet, and a method for forming a desired shape of barrier ribs in a PDP through a simple process.

A slurry composition for barrier ribs of a PDP according to one embodiment of the present invention comprises about 100 parts by weight of a mixture comprising a glass powder and a filler; about 20 to 50 parts by weight of a solvent; about 0.01 to 2 parts by weight of a dispersing agent; about 1 to 10 parts by weight of a plasticizer; and about 10 to 20 parts by weight of a binder.

A green sheet for barrier ribs of a PDP according to one embodiment of the present invention comprises a base film; a first film-forming layer disposed on a surface of the base film, wherein the first film-forming layer is preferably disposed by coating the surface of the base film with a first slurry comprising a glass powder, a filler, a solvent, a dispersing agent, a plasticizer, and a binder; and a second film-forming layer disposed on a surface of the first-film forming layer, wherein the second film-forming layer is preferably formed by coating a surface of the first film-forming layer with a second slurry comprising a glass powder, a filler, a solvent, a dispersing agent, a plasticizer, and a binder, and wherein the second film-forming layer has a different etching rate from the etching rate of the first film-forming layer.

A green sheet for barrier ribs of PDP according to another embodiment of the present invention comprises a base film; a first film-forming layer disposed on a surface of the base film; and a second film-forming layer disposed on a surface of the first-film forming layer, wherein the second film-forming layer has a different etching rate from the etching rate of the first film-forming layer.

A method for manufacturing barrier ribs of PDP according to one embodiment of the present invention comprises: (a) forming a first film-forming layer on a surface of a base film by applying a first slurry comprising a glass powder, a filler, a solvent, a dispersing agent, a plasticizer, and a binder, onto the surface of the base film; (b) forming a double-layered green sheet by forming a second film-forming layer on a surface of the first-film forming layer, wherein the second film-forming layer is disposed on the surface of the first film-forming layer by applying a second slurry comprising a glass powder, filler, a solvent, a dispersing agent, a plasticizer, and a binder, onto the surface of the first film-forming layer, and wherein the second slurry has a different density from the density of the first slurry; (c) forming a layer for barrier ribs by transferring the green sheet over a substrate with a dielectric layer; and (d) forming barrier ribs by partially removing the first and second film-forming layers.

The slurry composition, green sheet, and method for forming barrier ribs of a PDP according to the present invention can manufacture a desired shape of barrier ribs more easily than conventional barrier ribs in the art.

The present invention can also provide barrier ribs that are shaped structurally and mechanically stable enough to retain discharging space because the etching rates between the upper and lower parts of barrier ribs are different from each other. This prevents damage of barrier ribs by side-etching, wherein the side portions of the barrier ribs are over-etched.

BRIEF DESCRIPTION OF THE DRAWINGS

These and other features, aspects and advantages of the present invention will be better understood with reference to the following description, appended claims, and accompanying drawings wherein:

DETAILED DESCRIPTION OF THE INVENTION

Further scope of the present invention will become apparent from the detailed description given hereinafter. However, it should be understood that the detailed description and specific examples show preferred embodiments of the invention, which are given by way of illustration only, since various changes and modifications within the spirit and scope of the invention will become apparent to those skilled in the art.

Figure 1:
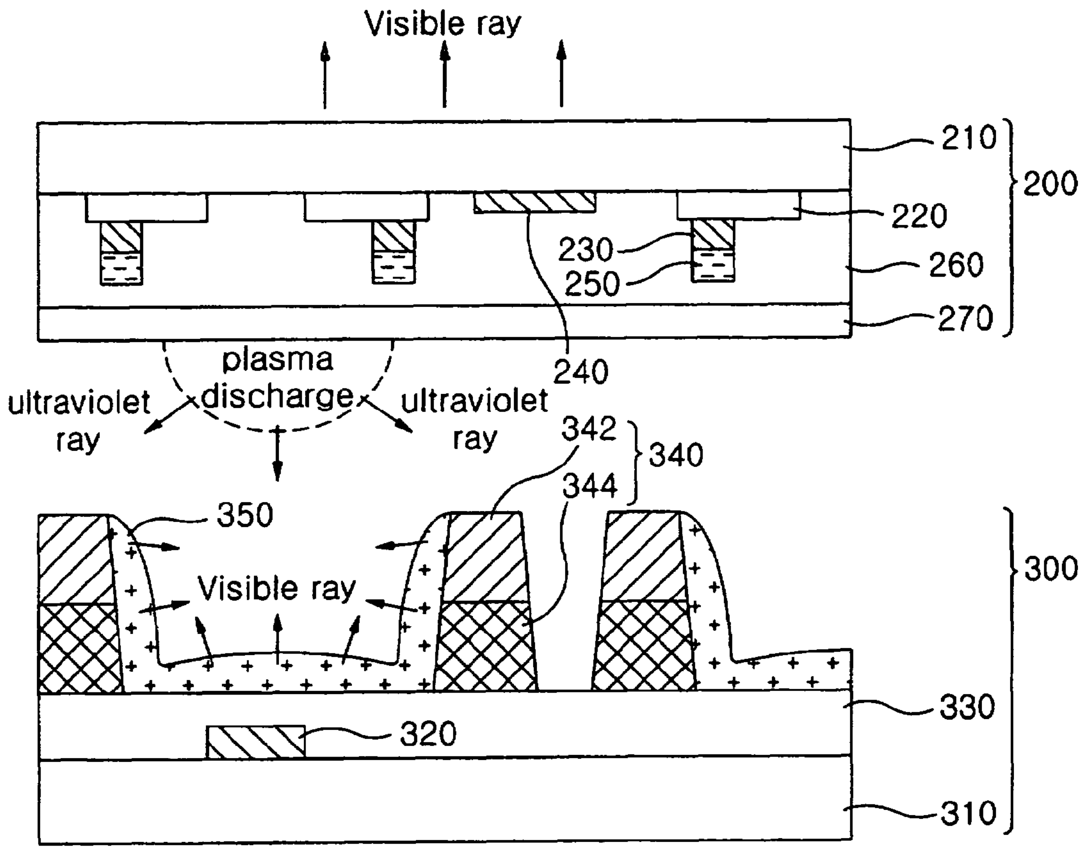
FIG. 1 is a cross-sectional view of a plasma display panel (PDP) according to a preferred embodiment of the present invention.

FIG. 1 is a cross-sectional view of plasma display panel (PDP) according to a preferred embodiment of the present invention.

FIG. 1 shows that the structure of a PDP is divided into an upper plate 200 and a lower plate 300. In the upper plate 200, transparent electrodes 220, bus electrodes 250, first black matrices 230, second black matrices 240, an upper dielectric layer 260, and a protection layer 270 are formed on the lower side of a glass substrate 210 (hereinafter, referred to as "upper substrates".) The transparent electrodes 220 may be made of a transparent conductive material such as indium tin oxide (ITO) or indium zinc oxide (IZO) to transmit light generated from discharge cells.

The bus electrodes 250 are present on the transparent electrodes 220 in order to reduce the line resistance of the transparent electrodes 220. The bus electrodes 250 may be made of a silver (Ag) paste having high conductivity. Since the bus electrodes 250 are generally made of a material with high electrical conductivity, they may reduce the driving voltage of the transparent electrodes 220 having relatively low electrical conductivity.

The first black matrices 230 are present as very thin layers between the transparent electrodes 220 and the bus electrodes 250, thereby allowing an electric current to pass between the transparent electrodes 220 and the bus electrodes 250, and enhancing the contrast of the PDP.

The second black matrices 240 are disposed between the discharge cells, and absorb outside light and inside transmitting light between adjacent discharge cells, thereby enhancing the contrast. And, the second black matrices 240 also play a role to divide or part the discharge cells.

The upper dielectric layer 260 directly contacts the bus electrodes 250 and may be made of a metallic material, and PbO-based glass may be used for the upper dielectric layer 260 in order to avoid chemical reactions with the bus electrodes 250. In an ever increasing trend to avoid lead (Pb) containing materials, non-lead containing materials may be used for the upper dielectric layer 260, for instance, bismuth oxide based glass, or other suitable glass may be used. The upper dielectric layer 260 restricts discharge current to maintain glow discharge, and the electric charges generated at the time of plasma discharge are deposited on the upper dielectric layer 260.

The protection layer 270 prevents damage to the upper dielectric layer 260 caused by sputtering at the time of plasma discharge, and increases the discharge efficiency of secondary electrons. The protection layer 270 may be made of magnesium oxide (MgO).

In the lower plate 300 of the PDP, a glass substrate 310 (hereinafter, referred to as "lower substrate"), and address electrodes 320 (only one shown in FIG. 1), a lower dielectric layer 330, barrier ribs 340 (each barrier rib 340 has a double-layered structure including a lower barrier rib 344 and an upper barrier rib 342), and a phosphor layer 350 are disposed on the upper surface of the lower substrate 310.

The address electrodes 320 are positioned at the center of each discharge cell. The address electrodes 320 may have a line width of about 70 to 80.

The lower dielectric layer 330 is disposed over the substantially all of the surface of the lower substrate 310 and the address electrodes 320, and the lower dielectric layer 330 protects the address electrodes 320.

The barrier ribs 340 are positioned on top of the lower dielectric layer 330 spaced by a predetermined distance from the address electrodes 320. The barrier ribs are formed to be longer in the direction perpendicular to layers such as the lower substrate, the lower dielectric layer, etc.

The barrier ribs 340 have a double-layered structure comprising a lower barrier rib 344 and an upper barrier rib 342. The cross-sectional shape of the barrier ribs 340 may be a rectangular shape, wherein the upper barrier rib 342 has the same width as the lower barrier rib 344. Alternatively, the cross-sectional shape of the barrier ribs 340 may be a trapezoid shape, wherein the width of the upper barrier rib 342 is narrower than that of the lower barrier rib 344.

The barrier ribs 340 are present to maintain the discharge distance, and to prevent electrical and optical interference between adjacent discharge cells.

The phosphor layer 350 is formed on both sides of the barrier ribs 340 and the upper surface of the lower dielectric layer 330. The phosphor layer 350 is excited by ultraviolet rays generated at the time of plasma discharge to generate red (R), green (G) or blue (B) visible rays.

Hereinafter, the light emitting mechanism of a PDP will be described in detail.

Under a predetermined voltage (within a voltage margin) between the transparent electrode 220 and the bus electrode 250, when additional voltage, which is enough to create plasma, is applied to the address electrodes 320, a plasma is formed between adjacent the bus electrodes 250. A certain amount of free electrons exist in the gas, and a force ($F=q\cdot E$) is exerted to the free electrons when an electrical field is applied to the gas.

If the force-exerted electrons obtain energy (first ionization energy) enough to remove electrons in an outermost orbit, they ionize the gas, and the ions and electrons created in the gas move to both electrodes by electromagnetic force. Particularly, secondary electrons are generated when the ions collide with the protection layer 270, and the secondary electrons help to create the plasma.

Thus, a high voltage is needed to initiate an initial discharge, but once the discharge is initiated, a lower voltage is needed as the electron density increases.

The gas provided in the cells of a PDP is generally an inert gas, such as Ne, Xe, He, etc. Particularly, when Xe is under a quasi stable state, ultraviolet rays with a wavelength of between about 147 and 173 nm are generated and applied to the phosphor layer 350 to emit red, green or blue visible rays.

The color of visible rays emitted from each discharge cell is determined according to the kind of phosphor lining. Accordingly, each discharge cell becomes a sub-pixel representing a red, a green or a blue color.

The color of each discharge cell is controlled by combination of lights emitted from the three sub-pixels. In case of this exemplary PDP, controlling the time that the plasma is generated controls the color.

The visible rays generated as described above are emitted to the outside of the cell through the upper substrate 210.

Hereinafter, the manufacturing process of the lower plate 300, particularly the composition for the barrier ribs 340 and the manufacturing process thereof, will be described in detail.

Figure 2:
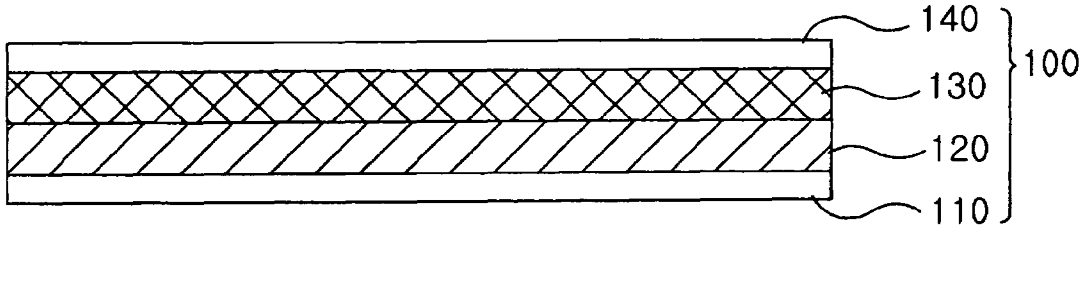
FIG. 2 is a cross-sectional view of a green sheet for barrier ribs of a PDP according to a preferred embodiment of the present invention.

FIG. 2 is a cross-sectional view of the green sheet for barrier ribs in PDP according to a preferred embodiment of the present invention.

Referring to FIG. 2, the green sheet 100 is a sheet adapted to the process of forming a constitutional element of a PDP, particularly the barrier ribs 340. The green sheet 100 comprises a first film-forming layer 120 and a second film-forming layer 130, which are formed by applying respective slurries onto a base film 110 and drying them thereafter. The step of drying preferably removes substantially almost all of the solvent(s). Also included is a protection film 140 disposed on a surface of the second film-forming layer 130. The base film 110 and the protection layer 140 are formed to be releasable from the film-forming layers 120 and 130.

The base film 110 may be a resin film, preferably having flexibility as well as thermal resistance and solvent resistance. The flexibility of the base film 110 helps to apply slurries onto the base film 110 so that the film-forming layers 120 and 130 may be made with a uniform film thickness. Also, the flexibility of the base film 110 allows the film-forming layers 120 and 130 to be stored in the shape of a roll.

The first and second film-forming layers 120 and 130 are pre-form layers, which become the barrier ribs 340 through the following processes. The slurry applied to the base film 110 for forming the first and second film-forming layers 120 and 130 may contain a glass powder, a filler powder, a solvent, a dispersing agent, a plasticizer and a binder. In addition, the slurry may further contain an additive to improve leveling property and application (coating) property.

The slurry may comprise about 100 parts by weight of a mixture comprising a glass powder and a filler; about 20 to 50 parts by weight of a solvent; about 0.01 to 2 parts by weight of a dispersing agent, about 1 to 10 parts by weight of a plasticizer; and about 10 to 20 parts by weight of a binder. The slurry may further comprise about 0.01 to 0.5 parts by weight of at least one additive, such as a leveling agent or an anti-foaming agent.

The glass powder may be at least one of PbO-based glass powder, a ZnO-based glass powder, a $Bi_2O_3$-based glass powder, or a mixture thereof. Preferably, the glass powder is a $PbO—B_2O_3—SiO_2$-based glass powder, a $PbO—B_2O_3—SiO_2—Al\ _2O_3$-based glass powder, a $ZnO—B_2O_3—SiO_2$-based glass powder, a $PbO—ZnO—B_2O_3—SiO_2$-based glass powder or mixtures thereof. The glass powder preferably adds to the structural integrity of the ribs ultimately to be formed from the slurry.

The filler may be at least one selected from the group consisting of $Al_2O_3$, ZnO, $TiO_2$ and mixtures thereof.

The solvent may be at least one selected from the group consisting of methyl ethyl ketone, ethanol, xylene, trichloroethane, butanol, methylisobutyl ketone (MIBK), ethyl acetate (EA), butyl acetate, cyclohexanone, water, propyleneglycol monomethyl ether, and mixtures thereof. The solvent may be present in an amount of about 20 to 50 parts by weight, preferably about 30 to 40 parts by weight.

The dispersing agent may be at least one selected from the group consisting of polyamine amide based material, phosphoric acid ester based material, polyisobutylene, oleic acid, fish oil, ammonium salt of a polycarboxylic acid, sodium carboxymethyl cellulose, and mixtures thereof. The dispersing agent may be present in an amount of about 0.01 to 2 parts by weight, preferably about 0.75 to 1.25 parts by weight.

The plasticizer may be at least one selected from the group consisting of phthalate based material, glycol based material, azelate based material, and mixtures thereof. The plasticizer may be present in an amount of about 1 to 10 parts by weight, preferably about 4 to 7 parts by weight.

The binder may be at least one selected from the group consisting of cellulose based material, vinyl based material, methacrylic based material, acrylic based material, and mixtures thereof. The binder may be present in an amount of about 10 to 20 parts by weight, preferably about 12 to 16 parts by weight.

The slurries are prepared to form the first and second film-forming layers 120 and 130 as shown in the foregoing description. However, it is noted that a first slurry for forming the first film-forming layer 120 and a second slurry for forming the second film-forming layer 130 should not be mixed while the slurries are applied onto the base film 110. To do so, the first slurry for forming the first film-forming layer 120 should have higher viscosity than the second slurry for forming the second film-forming layer 130 because the slurries may be mixed with each other at the time of coating due to same flowability if the two slurries have same viscosity. The viscosity difference between of the first film-forming layer 120 and the second film-forming layer 130 is preferably between about 100 cP and 5000 cP.

Also, the density difference between the first slurry and the second slurry is preferably between about 0.01 g/cm$^3$ and 1.0 g/cm$^3$.

Further, the first and second film-forming layers 120 and 130 preferably have a rheology of between about 1 to 3 TI, wherein TI refers to Thixotropic Index.

Hereinafter, the experimental results of the green sheet 100 made from the above slurries will be described in detail.

The first slurry for the first film-forming layer 120 contains about 100 parts by weight of a mixture including 71.1 parts by weight of a glass powder and 28.9 parts by weight of a filler. The first slurry further contains about 1 part by weight of a dispersing agent, 13 parts by weight of a binder, 36 parts by weight of a solvent, and 5 parts by weight of a plasticizer. The first slurry further contains 0.025 parts by weight of a leveling agent and 0.025 parts by weight of an antifoaming agent as additives.

The second slurry for the second film-forming layer 130 contains about 100 parts by weight of a mixture containing 73.3 parts by weight of a glass powder and 26.7 parts by weight of a filler. The second slurry further contains about 1 part by weight of a dispersing agent, 15 parts by weight of a binder, 37 parts by weight of a solvent, and 6 parts by weight of a plasticizer. The second slurry further contains 0.025 parts by weight of a leveling agent and 0.025 parts by weight of an antifoaming agent as additives.

Under the above composition ratios, the first slurry shows a viscosity of 2500 cP and 2.5 TI, and the second slurry shows a viscosity of 2000 cP and 2.0 TI. Therefore, the first slurry and the second slurry will not be mixed while applied over the base film.

In addition, the first film-forming layer 120 and the second film-forming layer 130 show a difference in etching rates under the same conditions as above, wherein the first film-forming layer 120 has a lower etching rate than the second film-forming layer 130. And, the inventors of the present invention find that the difference of content ratios of the glass powder and the filler between the first slurry and the second slurry provides such difference in the etching rate. For instance, the differences in content ratios of the glass powder and the filler between the first and second slurries preferably allow for differences in characteristics such as relative etching rates, relative viscosities, and relative densities. Exemplary but non-limiting examples of content ratios are as follows: The content ratio of glass powder: filler of the first and second slurries may fall within the range between about 2:1 and about 4:1, preferably between about 2.4:1 and about 2.8:1, provided that the content ratios are not the same between the first and second slurries and allow for the above differences in characteristic.

Hereinafter, the method of forming the green sheet 100 by coating the first film-forming layer 120 and the second film-forming layer 130 will be described in detail.

Figure 3A:
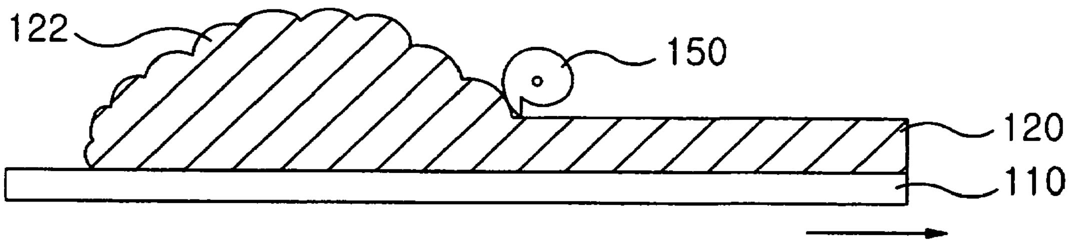
FIGS. 3A-3C are cross-sectional views illustrating the steps of manufacturing a green sheet for barrier ribs according to a first embodiment of the present invention.
Figure 3B:
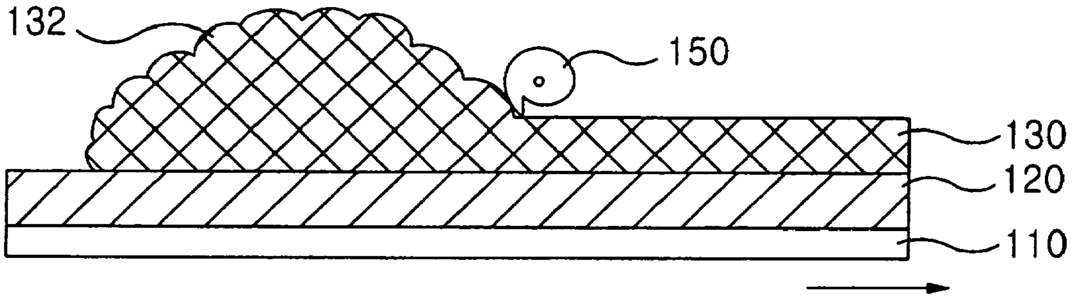
Figure 3C:
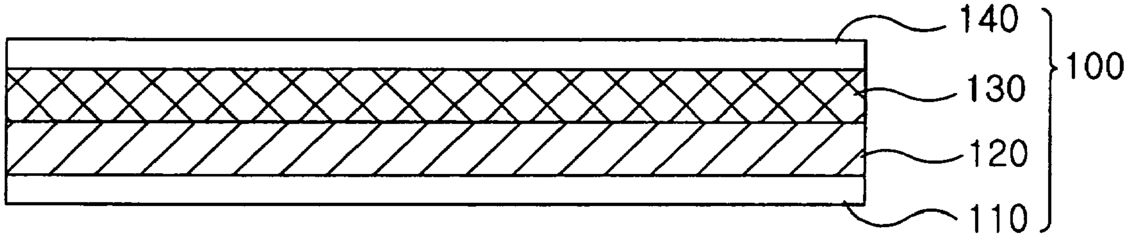
Figure 4A:
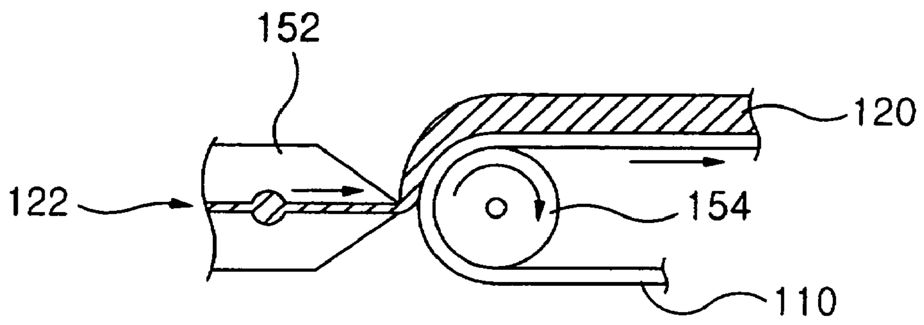
FIGS. 4A-4C are cross-sectional views illustrating the steps of manufacturing a green sheet for barrier ribs according to a second embodiment of the present invention.
Figure 4B:
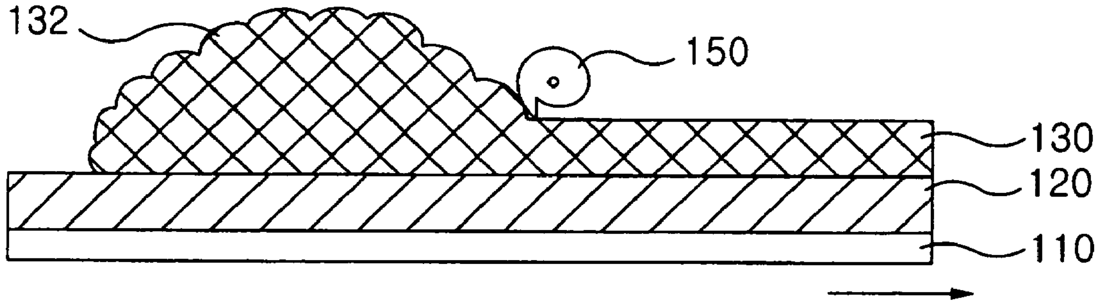
Figure 4C:
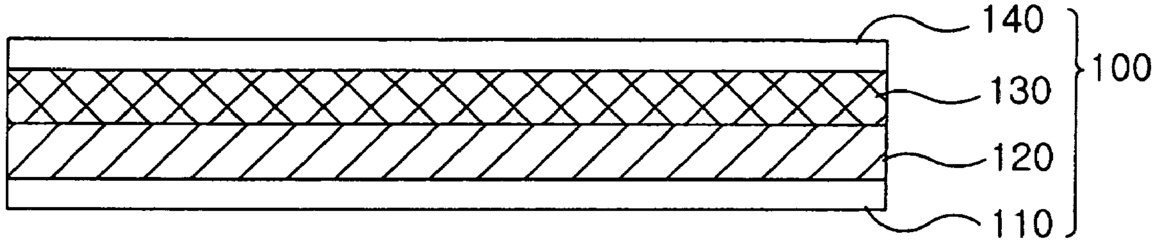
Figure 5A:
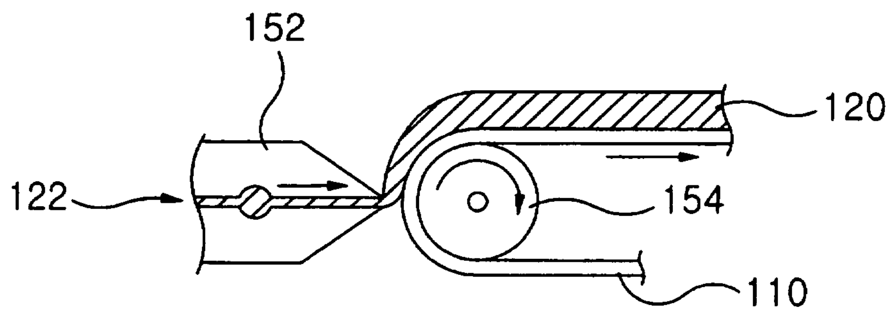
FIGS. 5A-5C are cross-sectional views illustrating the steps of manufacturing a green sheet for barrier ribs according to a third embodiment of the present invention.
Figure 5B:
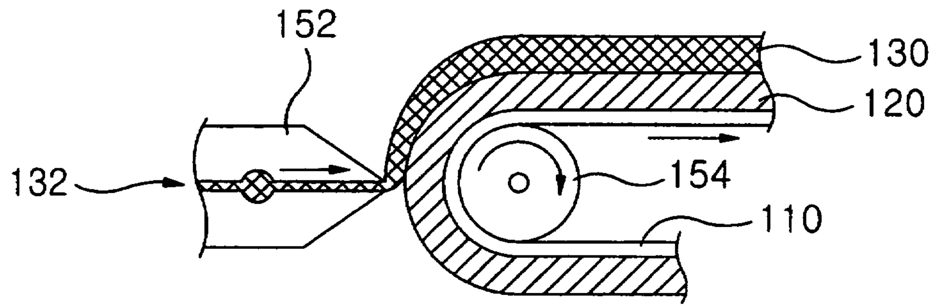
Figure 5C:
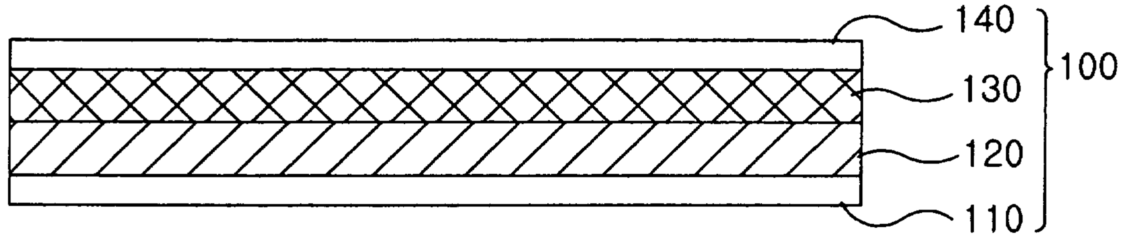
Figure 6A:
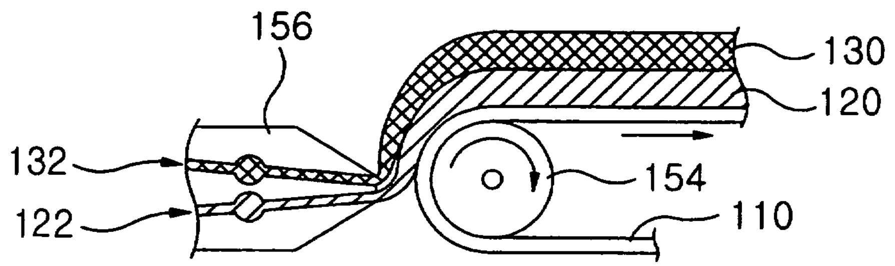
FIGS. 6A-6B are cross-sectional views illustrating the steps of manufacturing a green sheet for barrier ribs according to a fourth embodiment of the present invention.
Figure 6B:
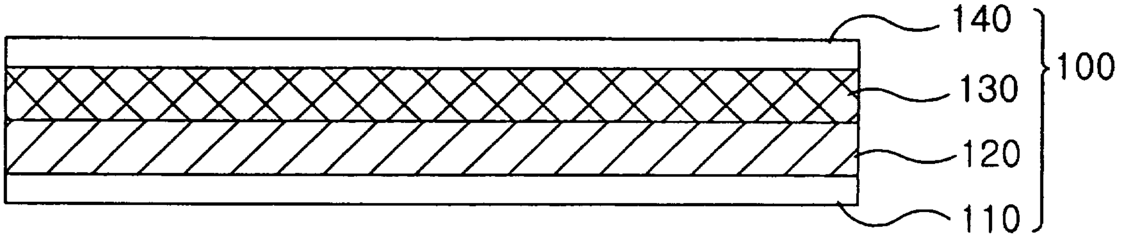

FIG. 3A-3C are cross-sectional views illustrating the steps of manufacturing a green sheet for barrier ribs according to a first embodiment of the present invention; FIG. 4A-4C are cross-sectional views illustrating the steps of manufacturing a green sheet for barrier ribs according to a second embodiment of the present invention; FIG. 5A-5C are cross-sectional views illustrating the steps of manufacturing a green sheet for barrier ribs according to a third embodiment of the present invention; and FIG. 6A-6C are cross-sectional views illustrating the steps of manufacturing a green sheet for barrier ribs according to a fourth embodiment of the present invention.

First, the method of forming the green sheet 100 according to the first embodiment of the present invention will be described in detail.

In the first embodiment of the present invention, both the first and second film-forming layers are obtained by using a comma coating method as specified below.

Referring to FIG. 3A, a certain amount of the first slurry 122 is provided onto the base film 110, and the base film 110 with first slurry 122 thereon is passed through a comma shaped knife 150 at a fixed speed to form the first film-forming layer 120 on the base film 110.

Subsequently, as shown in FIG. 3B, a certain amount of the second slurry 132 is provided onto the first film-forming layer 120 disposed on the base film 110, and then the base film 110 with first film-forming layer 120 and second slurry 132 thereon is passed through the comma shaped knife 150 at a fixed speed to form the second film-forming layer 130 over the base film 110. And then, the first film-forming layer 120 and the second film-forming layer 130 are dried.

And, as shown in FIG. 3C, the protection film 140 is covered over the second film-forming layer 130 to obtain the green sheet 100.

As described above, both the first and second film-forming layers 120 and 130 may be obtained by the comma coating method described above.

The method of manufacturing the green sheet 100 according to the second embodiment of the present invention will be described below. In this embodiment, the first film-forming layer is obtained by a die coating method, and the second film-forming layer is obtained by a comma coating method.

Referring to FIG. 4A, the first slurry 122 is filled in a slot shaped coater 152 (connected to a pump, not shown), and the base film 110 is wound around a roller 154. The first slurry 122 is discharged by activating the coater 152 while the roller 154 is rotated. As a result, the first film-forming layer 120 is formed on the base film 110.

Subsequently, as shown in FIG. 4B, a certain amount of the second slurry 132 is provided onto the first film-forming layer 120 disposed on the base film 110, and then the base film 110 with the first film-forming layer and the second slurry 132 thereon is passed through the comma shaped knife 150 at a fixed speed to form the second film-forming layer 130 over the base film 110. And then, the first film-forming layer 120 and the second film-forming layer 130 are dried.

Then, as shown in FIG. 4C, the protection film 140 is covered over the second film-forming layer 130 to obtain the green sheet 100.

As described above, the first film-forming layer 120 may be obtained by a die coating method, and the second film-forming layer 130 may be obtained by a comma coating method. Alternatively, it is obvious that the first film-forming layer may be obtained by a comma coating method, and the second film-forming layer may be obtained by a die coating method.

The method of manufacturing the green sheet 100 according to the third embodiment of the present invention will be described below. In this embodiment, both the first and second film-forming layers are formed by die coating methods.

Referring to FIG. 5A, the first slurry 122 is filled in a slot shaped coater 152 (attached to a pump, not shown), and the base film 110 is wound around a roller 154. The first slurry 122 is discharged by activating the coater 152 while the roller 154 is rotated. As a result, the first film-forming layer 120 is formed on the base film 110.

Subsequently, as shown in FIG. 5B, the second slurry 132 is filled in the slot shaped coater 152 (attached to a pump, not shown), and the base film 110 having the first film-forming layer 120 thereon is wound around the roller 154. Then, the second slurry 132 is discharged by activating the coater 152 while the roller 154 is rotated. As a result, the second film-forming layer 130 is formed on the first film-forming layer 120. And then, the first film-forming layer 120 and the second film-foaming layer 130 are dried.

And, as shown in FIG. 5C, the protection film 140 is covered over the second film-forming layer 130 to obtain the green sheet 100.

As described above, the first and second film-forming layers 120 and 130 may be obtained by die coating methods.

The method of manufacturing the green sheet 100 according to the fourth embodiment of the present invention will be described below. In this embodiment, the first and second film-forming layers are obtained by a dual die coating method.

Referring to FIG. 6A, the first and second slurries 122 and 132 are filled in a coater 156 with double slots (attached to at least one pump, not shown), and the base film 110 is wound around a roller 154. Then, the first and second slurries 122 and 132 are discharged together by activating the coater 156, and the roller 154 is rotated. As a result, the first film-forming layer 120 and the second film-forming layer 130 are formed together on the base film 110 as shown in FIG. 6B. And then, the first film-forming layer 120 and the second film-forming layer 130 are dried.

Further, as shown in FIG. 6B, the protection film 140 is covered over the second film-forming layer 130 to obtain the green sheet 100.

As described above, the first film-forming layer 120 and second film-forming layer 130 may be obtained by a dual die coating method.

The method of manufacturing the green sheet 100 is not limited to the foregoing described methods, and other methods, such as gravure method, L.P method, etc., may be also used.

Hereinafter, the method of manufacturing barrier ribs of a PDP by using the above green sheet 100 will be described.

FIG. 7A-7F are cross-sectional views illustrating the steps of manufacturing the barrier ribs of the PDP of FIG. 2.

Figure 7A:
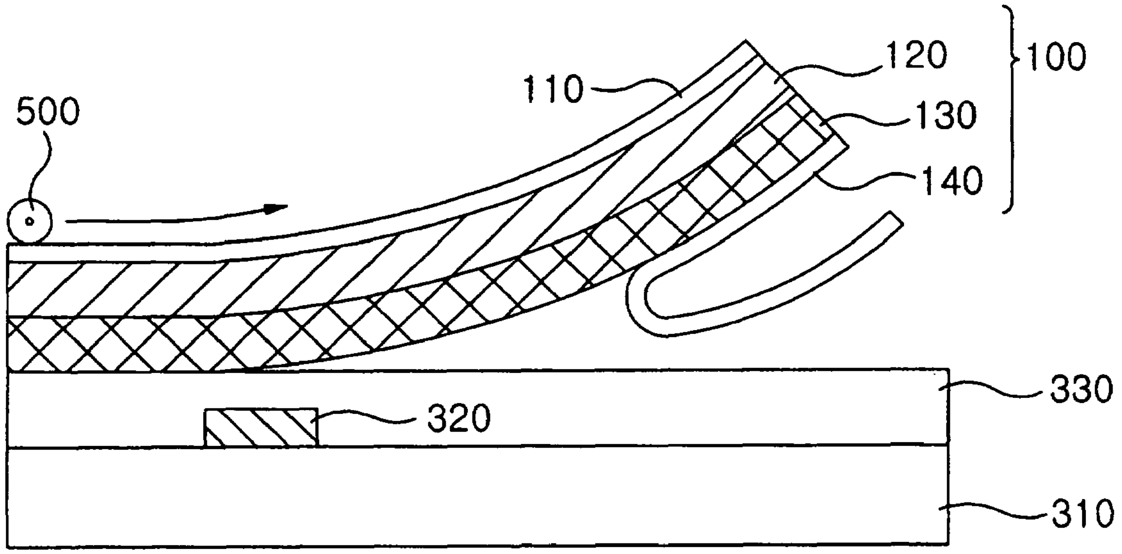
FIGS. 7A-7F are cross-sectional views illustrating the steps of forming the barrier ribs of the PDP of FIG. 2.

As shown in FIG. 7A, the green sheet 100 is transferred to the lower substrate 310 with the address electrodes 320 and the lower dielectric layer 330 disposed thereon. The address electrodes 320 and the lower dielectric layer 330 may be formed on the lower substrate 310 by any conventional method, such as sputtering, ionic plating, chemical deposition, electro deposition and the like.

Here, the protection film 140 is released from the second film-forming layer 130 of the green sheet 100, and then the second film-forming layer 130 is overlaid with the lower substrate 310 so that a surface of the second film-forming layer 130 and a surface of the lower dielectric layer 330 are contacted with each other. The direction of transferring the green sheet 100 is preferably perpendicular to the direction of the address electrodes 320.

Figure 7B:
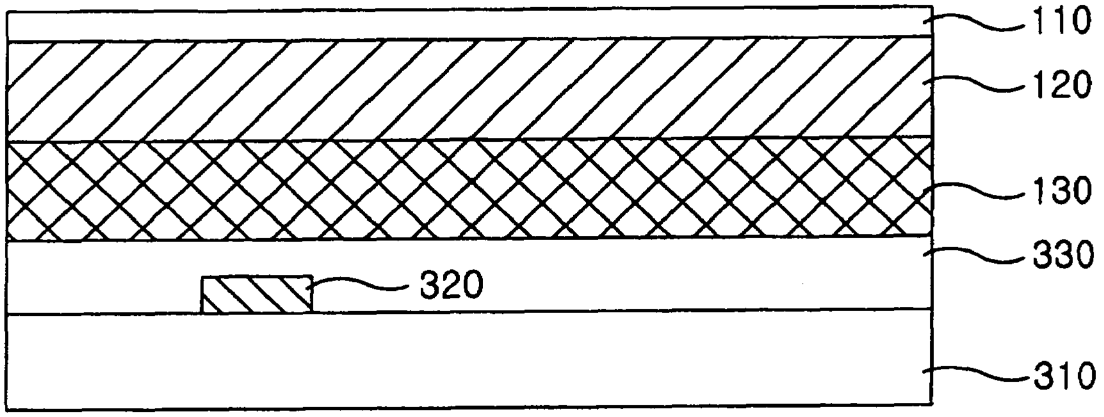

Subsequently, a movable heat roller 500 is moved and rotated on the green sheet 100 for thermo-compression so that the first and second film-forming layers 120 and 130 on the base film 110 may be transferred onto the lower substrate 310 as shown in FIG. 7B.

Figure 7C:
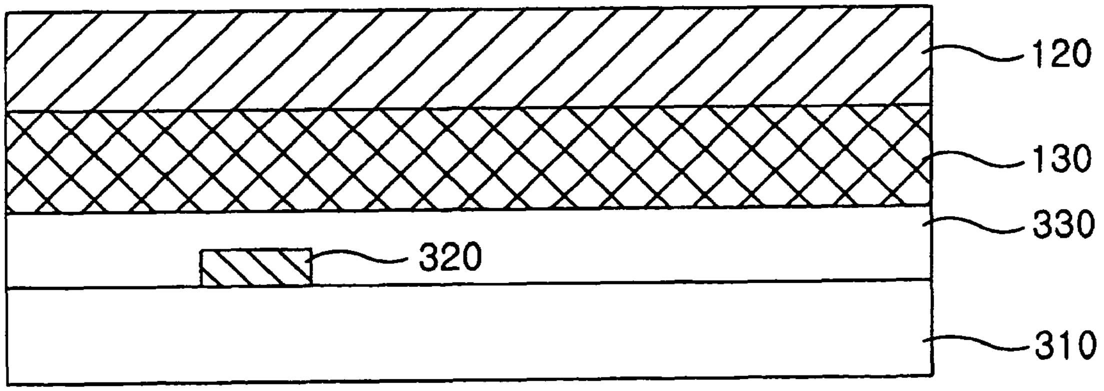

Then, as shown in FIG. 7C, the base film 110 is released from the first film-forming layer 120.

Then, thermal treatment is performed to the lower substrate 310 with the first film-forming layer 120 and second film-forming layer 130 thereon at a temperature over 500° C., thereby to sinter the first film-forming layer 120 and second film-forming layer 130.

Figure 7D:
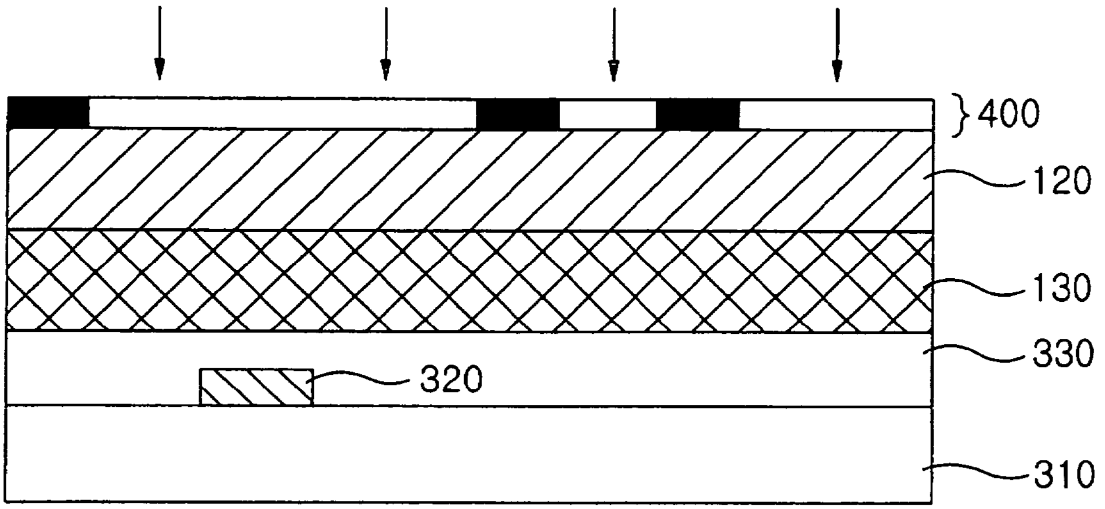

Subsequently, as shown in FIG. 7D, a mask 400 with openings therein is disposed on the first and second film-forming layers over the lower substrate. The openings of the mask 400 are formed in areas other than the areas for the location of the barrier ribs.

Figure 7E:
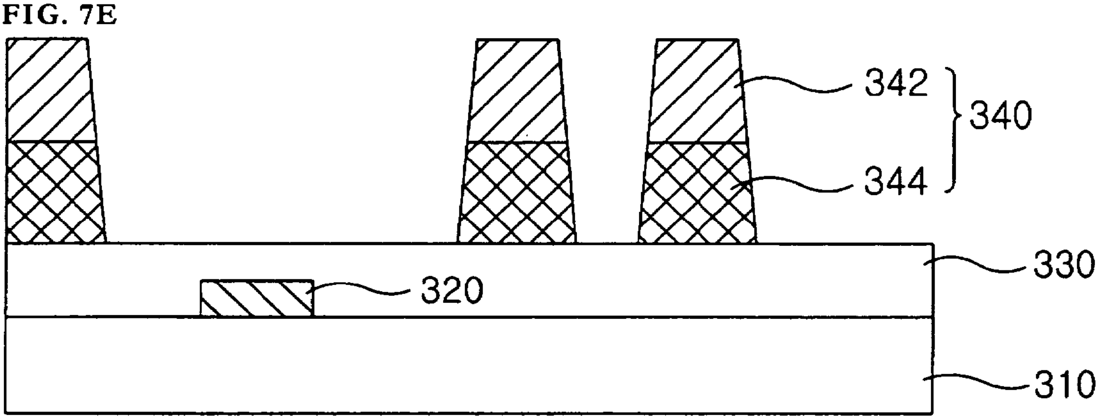

Next, the lower substrate 310 with the mask 400 thereon is treated with an etching agent, thereby removing the areas of the first and second film-forming layers 120 and 130 corresponding to the openings of the mask 400, and thereby shaping the barrier ribs having of an upper rib portion 342 and a lower rib portion 344 as shown in FIG. 7E.

In the etching process, the first film-forming layer 120 and the second film-forming layer 130 have different etching rates due to the difference of content ratios of glass powder and filler. Moreover, the content ratios are preferably designed so that the second film-forming layer 130 has a higher etching rate than the first film-forming layer 120. Under such conditions, the first film-forming layer 120 is damaged less by side etching while the second film-forming layer 130 is being etched. Thus, a rectangular or trapezoid cross-sectional shape of the barrier ribs, which are structurally and mechanically stable, can be obtained.

Figure 7F:
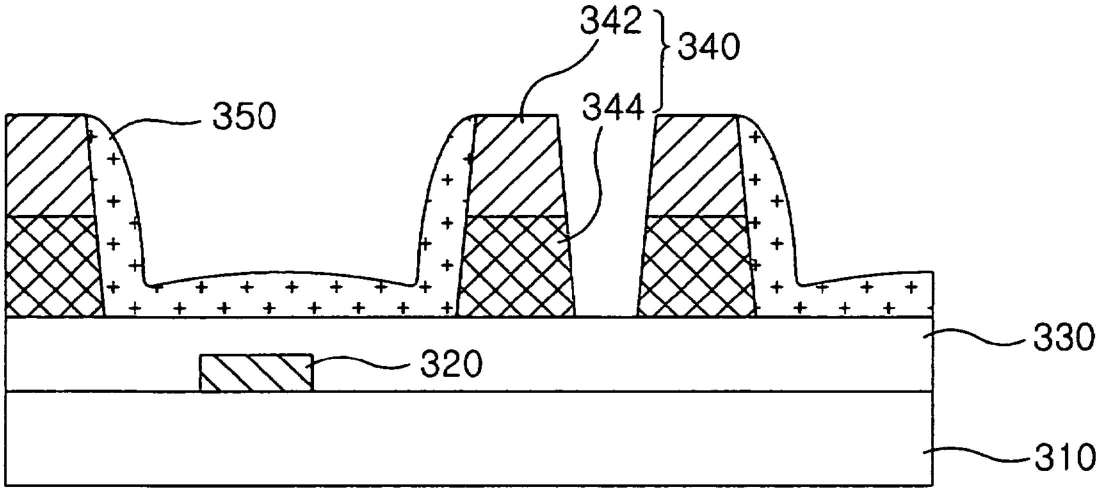

Subsequently, as shown in FIG. 7F, a phosphoric material is coated inside the cells defined by the barrier ribs 340 to form the phosphor layer 350.

The preferred embodiments of the invention have been described for illustrative purposes, and those skilled in the art will appreciate that various modifications, additions, and substitutions are possible, without departing from the scope and spirit of the invention as disclosed in the accompanying claims.

What is claimed is:

1. A green sheet for barrier ribs of plasma display panel comprising:

a base film;

a first film-forming layer including about 100 parts by weight of a mixture comprising a glass powder and a filler, about 0.01 to 2 parts by weight of a dispersing agent, about 1 to 10parts by weight of a plasticizer, about 10 to 20 parts by weight of a binder, and disposed on a surface of the base film; and a second film-forming layer including about 100 parts by weight of a mixture comprising a glass powder and a filler, about 0.01 to 2 parts by weight of a dispersing agent, about 1 to 10parts by weight of a plasticizer, about 10 to 20 parts by weight of a binder, and disposed on a surface of the first-film forming layer, wherein the second film-forming layer has an etching rate different from an etching rate of the first film-forming layer, and the filler is at least one selected from the group consisting of $Al_2O_3$, ZnO, $TiO_2$ and mixtures thereof, wherein the green sheet is a sheet for transferring the first and second film-forming layers to a substrate of the plasma display panel, wherein a density difference between the first film-forming layer and the second-film forming layer is between about 0.01g/cm$^3$ and 1.0g/cm$^3$.

2. The green sheet of claim 1, wherein the second film-forming layer has a higher etching rate than the first film-forming layer.

3. The green sheet of claim 1, further comprising a protective film disposed on a surface of the second film-forming layer.

4. The green sheet of claim 1, wherein the first film-forming layer and the second film-forming layer have different content ratios of glass powder and filler in the mixture.

5. The green sheet of claim 4, wherein the first film-forming layer and the second film-forming layer further comprises about 0.01 to 0.5 parts by weight of a leveling agent; and about 0.01 to 0.5 parts by weight of an antifoaming agent.

6. The green sheet of claim 4, wherein the glass powder is at least one selected from the group consisting of a PbO-based glass powder, a ZnO-based glass powder, a $Bi_2O_3$-based glass powder, and mixtures thereof.

7. A green sheet for barrier ribs of plasma display panel comprising:

a base film;

a first film-forming layer including about 100 parts by weight of a mixture comprising a glass powder and a filler, about 0.01 to 2 parts by weight of a dispersing agent, about 1 to 10parts by weight of a plasticizer, about 10 to 20 parts by weight of a binder, and disposed on a surface of the base film; and a second film-forming layer including about 100 parts by weight of a mixture comprising a glass powder and a filler, about 0.01 to 2 parts by weight of a dispersing agent, about 1 to 10parts by weight of a plasticizer, about 10 to 20 parts by weight of a binder, and disposed on a surface of the first-film forming layer, wherein the second film-forming layer has an etching rate different from an etching rate of the first film-forming layer, and the filler is at least one selected from the group consisting of $Al_2O_3$, ZnO, $TiO_2$ and mixtures thereof, wherein the green sheet is a sheet for transferring the first and second film-forming layers to a substrate of the plasma display panel, wherein the first film-forming layer has a higher viscosity than the second film-forming layer by a value of between 100 cP and 5000 cP.

* * * * *